July 16, 1957 R. M. MARONEY 2,799,471
HYDRAULIC CONTROL VALVE
Filed Jan. 10, 1955
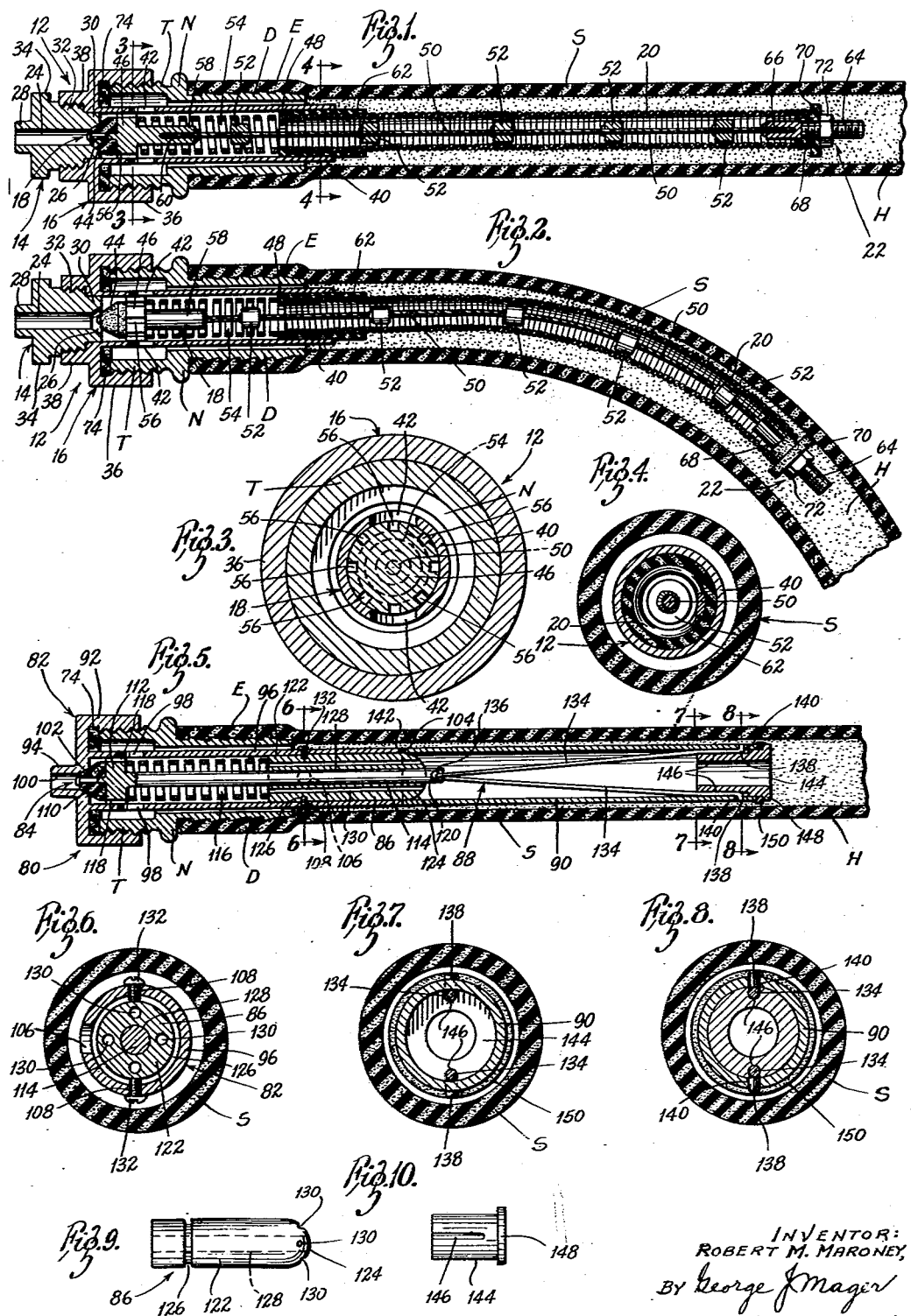
INVENTOR:
ROBERT M. MARONEY,
BY George J Mager
HIS ATTORNEY

United States Patent Office 2,799,471
Patented July 16, 1957

2,799,471

HYDRAULIC CONTROL VALVE

Robert M. Maroney, Oakland, Md., assignor of one-half to Thomas B. Sheehe, Oakland, Md.

Application January 10, 1955, Serial No. 480,729

13 Claims. (Cl. 251—342)

The present invention relates generally to valves of the type adapted to control the flow of fluids under pressure. More particularly, the present invention relates to hydraulic control valves of the type adapted to regulate the emission of fluid under pressure from a nozzle or the like associated with the delivery end of a flexible conduit.

Specifically, the present invention is directed to the provision of novel control means for incorporation in nozzle-equipped valve constructions designed primarily, though not exclusively, for mounting on the delivery end of a garden hose or the like.

One of the objects of the invention is to provide a novel valve assembly in the form of a self-contained unit that may readily be applied to or removed from the delivery end of a conventional garden hose.

Another object of the invention is to provide a self-contained valve assembly incorporating novel means for selectively controlling the volume of water flowing therethrough by manually flexing or bending that section of the hose in proximity to the delivery end whereon said assembly is mounted.

A further object is to provide a valve assembly of the type under consideration incorporating means adapted to automatically arrest the flow of water therethrough when that section of the hose in proximity to the delivery end whereon said assembly is mounted is disposed in its normal or unflexed plane.

Stated otherwise, the present invention is directed to the provision of a novel hydraulic control valve assembly that may be removably attached as a unit to the externally threaded nipple segment projecting from the delivery end of an ordinary garden hose. The assembled unit is of an elongated nature, and the major portion of the valve-operating mechanism thereof passes freely through the nipple of the hose and projects a short distance into the hose itself. Normally, the valve of the assembly is maintained in closed position by means of a compression spring, but flexing of that section of the hose wherein the valve-operating mechanism is disposed will effect the opening of the valve against the biasing action of said spring.

Means are provided for protecting the valve-operating mechanism at all times, and for protecting the interior surfaces of the hose against injury when the mechanism enclosing section thereof is flexed. Means are also provided in the assembly for the free passage therethrough of water under pressure when the valve is open.

The invention provides numerous advantages not found in prior art devices of this type. Thus for example, in order to shut off the flow of water, it is merely necessary to drop the hose to the ground. Such action automatically effects an instantaneous closing of the valve, and at such times, the water pressure itself aids the compression spring in effecting the quick closing of the valve. Should it be desired to move the hose without shutting off the water at the source of supply as is understood, it is merely necessary to grasp the hose far enough from the nipple to avoid bending that section thereof in proximity to said nipple.

In use, the hose is handled in the ordinary manner, being held in one hand. Flexing of the hose may be accomplished by the application of thumb pressure at the nipple end, whereby to open the valve. To effect closing of the valve, it is merely necessary to relax the thumb, as will appear.

A more comprehensive understanding of the invention may be had from the detailed description thereof to follow with reference to an accompanying sheet of drawings wherein two embodiments are illustrated.

With reference to said drawings:

Figure 1 is a central longitudinal sectional view of a valve assembly embodying the principles of the present invention, said assembly being shown removably mounted on the delivery end section of an ordinary garden hose;

Figure 2 is a similar view demonstrating a moved disposition of certain elements included in said valve assembly consequent to a flexing of the hose section adjacent the delivery end section thereof;

Figure 3 is a transverse sectional view on an enlarged scale, taken substantially along the line 3—3 of Figure 1;

Figure 4 is a transverse sectional view on an enlarged scale, taken on the line 4—4 of Figure 1;

Figure 5 is a view similar to Figure 1, illustrating another valve assembly embodying the principles of the present invention;

Figures 6, 7 and 8 are transverse sectional views on an enlarged scale, taken respectively on the lines 6—6, 7—7 and 8—8 of Figure 5;

Figure 9 is a plan view of a hollow guide plug included in the Figure 5 assembly; and Figure 10 is a plan view of a flanged retainer sleeve also included in said Figure 5 assembly.

With further reference to the drawings, the present invention is illustrated in association with a fragmentarily shown ordinary garden hose designated H. As is well known, a hose of this character usually terminates in a nipple N including an externally threaded segment T that projects beyond, and an externally deformed segment D that is embedded in, the delivery end section E of said hose. In the interest of clarity hereinafter, that section of the hose H adjoining the delivery end section E thereof is designated S. It is of course understood that the nipple construction illustrated is exemplary only, the invention being adapted for use with clamped on nipples also.

With attention directed to that form of my invention disclosed in Figures 1 through 4, numeral 12 indicates generally a valve assembly removably mounted on the nipple segment T, and supported therefrom to extend into the section S of the hose H.

Broadly, the assembly 12 includes a combined nozzle and valve seat member generally designated 14; a cylindrical valve housing generally designated 16; a valve mechanism designated 18; a resilient coil element 20; a composite device generally designated 22 whereby fine adjustments of the valve mechanism are obtainable; and other elements and formations associated with and provided in the structures aforesaid, as will be described in more detail below.

Centrally thereof, the member 14 has formed therein a longitudinal bore 24 terminating at what will be called its inner end in a conical valve seat 26, and at what will be called its outer end, within a nozzle extension 28. That portion of the member 14 surrounding the valve seat and indicated by the numeral 30 is cylindrical, and the adjacent larger diametered portion 32 thereof is provided with external threads, as shown in Figures 1 and 2. A polygonal segment of the member 14 is indicated by the numeral 34.

The valve housing 16 is hollow, and includes: an internally threaded cap segment 36; an internally threaded projecting boss segment 38; and a tubular segment 40 provided with one or more circular openings 42. The aforesaid cap, boss, and tubular segments are illustrated as being integrally formed, but it is to be understood that in manufacture they may be separately formed and united by suitable means if desired. The external diameter of the tubular segment 40 is smaller than the internal diameter of the nipple section D, as clearly shown in Figures 1 and 2.

The mechanism 18 includes: a conical valve element 44, preferably of rubber; a valve element supporting guide 46 that is slidable in the tubular segment 40 of the valve housing; a ring 48 disposed in said tubular segment; a length of wire cable 50; a plurality of spaced collar elements 52 affixed to the wire cable; and a compression spring 54. As shown clearly, particularly in Figure 3, the main body portion of the guide 46 has its periphery provided with a series of circularly spaced longitudinal grooves or passageways 56, and has integrally formed therewith an axially projecting stem 58 having a socket 60 formed therein. Disposed in said socket and securely retained therein by means of solder as shown or otherwise, is what will be termed the leading end of the wire cable 50. The spaced collar elements 52 are rigidly secured to the cable 50 by means of solder as shown, or otherwise. The diameters of said collars are smaller than the internal diameters of the coil 20 and the compression spring 54, as shown.

The outer end of the coil element 20 extends into the tubular segment 40, and is permanently secured therein by means of a contractible rubber sleeve 62 that embraces said end of the coil and impinges against the inner periphery of said tubular segment.

The adjustment device 22 includes: a stud element 64 having a socket 66 formed therein; a sleeve member 68 of rubber or the like having an annular flange 70 of greater diameter than that of the coil element 20; and a nut 72 engaging the threaded portion of said stud, and bearing against the flange 70 of the sleeve member 68 aforesaid. Disposed in the socket 66 and securely retained therein by means of solder as shown or otherwise, is what will be termed the trailing end of the wire cable 50.

From the foregoing description and the drawings, it should be apparent that the assembly 12 constitutes a self-contained unit that may easily be applied to and removed from the hose by rotating the valve housing cap segment 36 into or out of threaded engagement with the nipple segment T. To prevent leakage, a rubber washer 74 is interposed in the cap segment 36 between the end wall thereof and the adjacent marginal edge of the threaded nipple segment, as shown.

The assembling operation of the unit 12 will now be described. After the combined nozzle and valve seat member 14 has been screwed into the valve housing 16, the valve mechanism 18 is inserted into the tubular segment 40 until the conical valve element 44 engages the seat 26. Thereupon, the spiral spring 54 is inserted in said tubular segment followed by the ring 48, it being noted that the opening in said ring is large enough to freely pass over the stud 64 and the collars 52.

The sleeve 62 having first been positioned on the outer end portion of the coil 20, said end is then inserted into the tubular segment until it contacts the ring 48. Thereupon sufficient pressure is applied to the coil to compress the spring 54, whereupon the inner end portion of the tubular segment 40 may be crimped about said sleeve.

In consequence of the binding action exerted by the sleeve 62 against both the inner peripheral surface of the tubular segment and the outer peripheral surface of the coil, a permanent connection results, as should be evident. It should likewise be evident that with this arrangement, the preloaded compression spring 54 normally maintains the valve element 44 in positive engagement with the seat 26. It is noted at this point, that the diameters of the compression spring 54 and of the coil 20 are identical, wherefore the therebetween interposed ring 48 serves not only to provide an abutment that prevents the sleeve 62 from interfering with the free action of the compression spring, but also serves to provide a more adequate seat for the adjacent end of said spring.

With the parts assembled as described, the sleeve member 68 is inserted in what will be termed the inner end of the coil 20. Thereupon the nut 72 is applied to the stud 64, and drawn into firm engagement with the flange 70 of the sleeve member. It is important that the wire cable 50 be placed in taut condition with the valve element 44 seated, wherefore the nut 72 may be manipulated until such condition is assured. A very fine adjustment is obtainable by blowing into the nozzle 28 as the nut is being adjusted. The sleeve member 68 being of yieldable material as hereinbefore noted, lends itself readily to this final step in the assembly operation, and serves also to prevent fortuitous loosening of the nut 72 thereafter. The annular flange 70 projects beyond the periphery of the coil 20 for a reason to appear hereinafter.

Another embodiment of my invention is illustrated in Figures 5 through 10. In this embodiment, numeral 80 indicates generally a valve assembly also removably mounted on the nipple segment T, and supported therefrom to extend into the section S of the hose H.

Broadly, the assembly 80 includes a combined nozzle and valve housing generally designated 82; a valve mechanism generally designated 84; a hollow guide plug 86 that is shown per se in Figure 9; a substantially V-shaped resilient wire member 88; an elongated cylinder 90; and elements and formations associated with and provided in the structures aforesaid, as will now be described in more detail.

The valve housing 82 is generally cylindrical, and includes: an internally threaded cap segment 92; a projecting nozzle segment 94; and a tubular segment 96 provided with one or more circular openings 98, and having an external diameter smaller than the internal diameter of the nipple section D.

A longitudinal bore 100 that is formed in the nozzle segment, terminates at its inner end in a conical valve seat 102. Numeral 104 designates the marginal edge of the inner end of said tubular segment 96, and numeral 106 designates a sight opening formed therein near said edge. In radial alignment with the opening 106, the tubular segment 96 has also formed therein a pair of diametrically opposite threaded apertures 108, as best seen in Figure 6.

The mechanism 84 includes: a conical valve element 110, preferably of rubber; a valve element-supporting guide 112 that is slidable in the tubular segment 96; an integral rod 114 projecting axially from the main body portion of the guide; the plug 86 aforesaid; and a compression spring 116. The main body portion of the guide 112 is provided in its periphery with a series of circularly spaced longitudinal grooves or passageways 118, and the free extremity of the rod 114 is provided with a circular hole 120.

The plug element 86 comprises a generally cylindrical body 122 having a semicircular end 124. An annular groove 126 is formed externally in the plug body, and centrally thereof said body is bored longitudinally, as indicated at 128, for slidably supporting the free end portion of the rod 114. Also formed in the plug body 122, is a series of circularly spaced longitudinal passageways 130. A pair of screws 132, each engaging one of the threaded apertures 108 and extending into the annular groove 126, serve to maintain the plug 86 in position.

The resilient wire member 88 as best seen in Figure 5, includes a pair of leg portions 134 connected by a rounded apex portion 136 that extends through the hole 120 of the rod 114. Each leg portion 134 terminates in an integral hook portion 138 adapted to engage in one of a pair of diametrically opposite holes 140 provided therefor adjacent the inner end of the elongated cylinder 90. Numeral 142 indicates the marginal edge of the outer end of cylinder 90, and normally, this edge abuts the edge 104 of the tubular segment 96.

Shown per se in Figure 10 is a retainer sleeve 144 having a pair of diametrically opposite longitudinal grooves 146 formed externally therein, and provided at one end with a circular flange 148. Numeral 150 designates a ring of rubber or the like interposed between the inner end marginal edge of cylinder 90, and the flange 148 of said retainer sleeve 144.

From the preceding description and the drawings, it should be apparent that the assembly 80 constitutes a self-contained unit that may easily be applied to and removed from the hose by rotating the valve housing cap segment 92 into or out of threaded engagement with the nipple segment T. To obviate leakage, a rubber washer 74 is interposed in the cap segment 92 between the end wall thereof and the adjacent marginal edge of the threaded nipple segment, as shown.

The assembling operation of the unit 80 will now be described briefly. Following insertion of the valve element-supporting guide 112 into the tubular segment 96 of the valve housing, the spiral spring 116 is inserted. Thereupon, the plug 86 is positioned with the rod 114 extending through the longitudinal bore 128. Pressure is then applied to the semicircular end 124 of the plug until the annular groove 126 appears in the sight opening 106, whereupon the screws 132 are caused to engage in said groove as shown in Figure 6. In consequence of this procedure, the spring 116 is compressed, whereby to bring the conical valve element 110 into sealing engagement with the valve seat 102. Next, the resilient wire member 88 is positioned, the hole 120 in rod 114 being of such size as to accommodate the passage therethrough of the hook and leg portions thereof. The leg portions 134 are then brought together, whereupon the cylinder 90 is slid over them until the outer end edge 142 of said cylinder contacts the inner end edge 104 of the tubular segment. The cylinder may now be rotated until the hooks 138 snap into the holes 140. Thereupon, the retainer sleeve 144 is pressfitted into the inner end portion of the cylinder, with the ring 150 in position as demonstrated in Figure 5. The grooves 146 accommodate the extremities of the leg members 134, as shown. The diameter of the rubber ring 150 is larger than that of cylinder 90 and that of the flange 148 for a reason to be explained below.

*Operation*

Both forms of the invention illustrated, operated and are operable in similar fashion. That is to say, a flexing or bending of the hose section S will, with respect to both constructions, effect the axial withdrawal of the valve element from engagement with its valve seat. Should a person, performing for example a lawn watering operation, desire the emission of a stream of water, the hose section S would be bent substantially into the curved or arcuate configuration thereof exemplarily shown in Figure 2, where it will be observed that the valve element has been caused to move inwardly against the biasing force of the preloaded compression spring a sufficient distance to place the valve in approximately fully open condition. Should the emission of a smaller stream be desired, then the hose section S would be bent along an imaginary arc of greater radius than demonstrated in Figure 2. Should the emission of a spray be desired, a very slight curving of said hose section would suffice. Should it be desirable to interrupt the watering operation for the time being, it is only necessary to straighten out the hose section S, or drop the hose to the ground. When this is done, the compression spring automatically effects the sealing of the valve.

With particular reference now to the embodiment shown in Figures 1 through 4, it is noted that adequate means are provided in the valve assembly 12 for insuring the free flow of water under pressure therethrough when the element 44 is withdrawn from the valve seat 26 in consequence of flexing the hose section. Thus, water will flow through the annular space surrounding the tubular segment 40 and into the chamber adjacent the valve via the openings 42, and the passageways 56 in the guide. Obviously, water will also simultaneously flow through the coil element 20, the tubular segment 40, and the passageways 56 toward the valve. When the hose section S is flexed, the inner surface thereof engages the rubber flange 70 as demonstrated in Figure 2, thus obviating any damage to the hose interior surface that could develop as a result of repeated flexings. The collars 52 serve to insure smooth reciprocal movements of the cable 50. The coil element 20 is inherently straight, so that when curved and then released, it will automatically revert to its Figure 1 disposition as the compression spring simultaneously effects the seating of the valve element.

With particular reference now to the embodiment illustrated in Figures 5 through 10, it will be observed that adequate means are also provided in the valve assembly 80 for insuring free flow of water under pressure therethrough when the valve element 110 is withdrawn from its seat 102 in consequence of flexing the hose section S. Thus, water will flow through the annular space surrounding the tubular segment 96 and into the chamber adjacent the valve via the openings 98, and the passageways 118. Water will also simultaneously flow through the retainer sleeve 144, cylinder 90, the passageways 130 of the plug 86, and the passageways 118 aforesaid. When the hose section S is flexed, the inner surface thereof engages the rubber ring 150, thus preventing internal damage to the hose. The apex portion 136 and the hole 120 cooperate to form a swivel connection. Normally, the outer end marginal edge 142 of the cylinder 90 abuts the inner end marginal edge 104 of the tubular segment, there being 360° contact. When the hose section S is flexed however, a portion of the edge 142 moves away from the edge 104 as the cylinder 90 is tilted, the then remaining in contact portions of said edges serving with the semicircular end 124 of the plug in what will be termed a pivotal capacity. Tilting of the cylinder 90 in this manner, obviously increases the distance between the inner end thereof and the swivel connection 120—136, thus unseating the valve element 110 against the biasing force of the compression spring 116.

From the foregoing description augmented by an inspection of the drawings, it is believed that a comprehensive understanding of my invention and its advantages should be apparent.

Whereas the preferred embodiments have been disclosed herein, the invention may obviously admit of slight structural changes without departing from the scope thereof as set forth in the claims.

What I claim is:

1. In a valve assembly of the character described: a valve housing; means on the valve housing for mounting the assembly removably on the externally threaded projecting segment of a hose nipple; a conical valve seat provided in the housing; a conical valve element of rubber or the like mounted on a supporting guide reciprocable in a tubular segment of the housing; a preloaded compression spring constantly biasing the valve element into positive engagement with the valve seat; and mechanism supported at one end from said valve housing and extending freely through said nipple into the hose for effecting incremental axial movements of the valve element away from the valve seat against the biasing force of said spring in response to flexings of that section of the hose whereinto the mechanism extends, said mechanism including resilient means for reciprocating said supporting guide, and means for obviating injury to the internal surfaces of said hose in consequence of repeated flexings thereof.

2. In a self-contained valve assembly of the character described, a generally cylindrical housing including: an internally threaded cap segment securing the housing removably on the externally threaded section of a hose nipple; a nozzle and a valve seat; an axially projecting tubular segment terminating at its outer end adjacent the valve seat and having openings formed therein for the passage therethrough of water under pressure toward said valve seat, the diameter of said segment being smaller than the internal diameter of said hose nipple; a valve element supported on the outer end of a guide member slidable in the tubular element; a series of circularly spaced grooves formed longitudinally in the periphery of the guide member for passage therethrough of water under pressure toward said valve seat; a preloaded compression spring constantly biasing the valve element into fluid-tight contact with the valve seat; and resilient means supported from the inner end of the tubular segment serving to withdraw said valve element from fluid-tight contact with the valve seat against the biasing force of the compression spring in consequence of flexings of that section of the hose adjacent the nipple-supporting end thereof.

3. In a self-contained valve assembly of the character described: the mechanism recited in claim 2 wherein the resilient means supported from the inner end of the tubular segment extends freely into said section of the hose adjacent the nipple-supporting end thereof, and includes means preventing damage to the interior surfaces of said hose section during flexings thereof.

4. In a self-contained valve assembly of the character described, a generally cylindrical housing including: an internally threaded cap segment securing the housing removably on the externally threaded segment of a hose nipple; an internally threaded boss segment projecting axially in one direction and engaging an externally threaded portion of a nozzle member having a valve seat formed therein; and a tubular segment projecting axially in the opposite direction accommodating reciprocal movements of a valve element slidably supported therein, the diameter of the tubular segment being smaller than the internal diameter of said hose nipple, and having openings formed therein for the passage therethrough of water under pressure toward the valve seat aforesaid.

5. In a self-contained valve assembly of the character described: the generally cylindrical housing set forth in claim 4 in combination with a preloaded compression spring in said tubular segment constantly biasing said valve element into engagement with said valve seat; and means including a resilient coil element secured at one end in the tubular segment for counteracting the biasing force of said spring responsive to flexings of that section of hose in proximity to said nipple.

6. In a self-contained valve assembly of the character described: the generally cylindrical housing set forth in claim 4 in combination with a preloaded compression spring in said tubular segment constantly biasing said valve element into engagement with said valve seat; means including a resilient coil element secured at one end in the tubular segment for counteracting the biasing force of said spring responsive to flexings of that section of hose in proximity to said nipple, and means mounted on the other end of said coil element for effecting fine adjustments of said valve element relatively to the valve seat aforesaid.

7. In a self-contained valve assembly of the character described: a valve housing; a valve element; a valve seat; a supporting guide for the valve element slidable in a tubular segment of the housing toward and away from said valve seat; a preloaded compression spring in the tubular segment constantly biasing the guide toward the valve seat; a length of wire cable having its leading end permanently secured to said guide; a resilient coil element having its outer end rigidly secured in the inner end portion of the tubular segment; a ring interposed in the tubular segment between the compression spring and said outer end of the coil element; a plurality of spaced collar elements affixed to said wire cable, the diameters of said collar elements being smaller than the internal diameters of said compression spring and said coil element; an externally threaded stud element rigidly secured to the trailing end of the wire cable; a rubber sleeve about a portion of the stud and having an annular flange of greater diameter than the coil element in engagement with the inner end thereof; and a nut engaging said stud element and bearing against said flange whereby to maintain said cable in a determinate disposition of tautness.

8. In a self-contained valve assembly of the character described: the structure set forth in claim 7, wherein the main body portion of the supporting guide for the valve element is provided with a series of circularly spaced longitudinal passageways and said tubular segment of the valve housing is provided with circular openings accommodating the flow of fluid therethrough toward said valve seat.

9. A self-contained hydraulic control valve assembly for use with a flexible hose having a nipple permanently secured in the delivery end thereof, said assembly comprising in combination: a valve housing including an internally threaded cap segment for engaging the externally threaded projecting portion of said nipple, a tubular segment of smaller diameter than the internal diameter of the nipple, and an internally threaded axially projecting boss segment; at least one fluid inlet opening formed in the tubular segment; a nozzle member including a polygonal and a threaded segment removably secured in said projecting boss of the housing; a conical valve seat formed in the inner cylindrical end portion of said nozzle member; a conical valve element of rubber or the like supported by a guide slidably disposed in said valve housing tubular segment; a preloaded compression spring biasing the guide member in a direction to maintain the valve element in fluid tight disposition against the valve seat; a series of circularly spaced longitudinal fluid passageways formed in the peripheral surface of said guide; an axially projecting stem integral with the guide and having a socket formed therein; a wire cable having its leading end rigidly secured in said socket; a resilient coil element having its outer end rigidly secured in the inner end of said tubular segment by means of a resilient sleeve member; a ring interposed in the tubular segment about the cable between said outer end of the coil element and the inner end of said compression spring; a plurality of spaced collars rigidly affixed to the cable reciprocable within said compression spring and coil element; a threaded stud having a socket formed therein, the trailing end of the wire cable being rigidly secured in said socket; a rubber sleeve about a portion of said stud and having an annular flange of larger diameter than the coil element, said flange being disposed against the inner end face of said coil element; and a nut engaging said stud and bearing against the inner face of said flange.

10. In a self-contained valve assembly of the character described, a generally cylindrical housing including: an internally threaded cap segment for securing the housing removably on the externally threaded projecting segment of a hose nipple; a nozzle segment projecting axially in one direction; a tubular segment projecting axially in the opposite direction to accommodate reciprocal movements of a valve element slidably supported therein, the diameter of the tubular segment being smaller than the internal diameter of said hose nipple; a valve seat in the end wall of the cap segment providing fluid communication between said nozzle and tubular segments; at least one opening in the tubular segment in proximity to the valve seat to accommodate passage of fluid under pressure therethrough toward said valve seat; and a pair of diametrically opposite internally threaded openings formed in the tubular segment in radial alignment with a slight opening provided therein whereby to facilitate the positioning of a plug member in the inner end portion thereof.

11. In a self-contained valve assembly of the character described, the generally cylindrical housing set forth in claim 10 in combination with a preloaded compression spring in said tubular segment constantly biasing the valve element into fluid tight engagement with said valve seat, and means adapted to overcome the biasing force of said spring responsive to flexings of that section of hose in proximity to said nipple, said means including: an elongated cylinder normally disposed in alignment with the tubular segment; a plug inserted into the inner end portion of the tubular segment and retained therein by means of screws engaging said threaded openings and extending into a peripheral groove provided in said plug; a valve element supporting guide reciprocable in the tubular segment and having an integral axially projecting rod slidably disposed in the plug and projecting inwardly therebeyond; a semicircular end on the plug extending into the outer end of the elongated cylinder; a resilient wire member including a pair of leg portions connected by a rounded apex portion, said apex portion extending freely through a hole provided therein adjacent the free inner extremity of said rod; and means for rigidly securing the terminal ends of said leg portions to the inner end portion of the elongated cylinder aforesaid.

12. In a self-contained valve assembly of the character described, in combination: a valve seat and a valve element; a reciprocable guide member supporting the valve element and having axially projecting rod extending therefrom; a preloaded compression spring normally biasing the guide member in a direction effecting fluid tight engagement of the valve element relatively to the valve seat; a plug having a central longitudinal bore to slidably support said rod; an elongated cylinder; a semicircular end portion on the plug extending into the outer end portion of the cylinder; a hole formed in the free extremity of said rod; a resilient wire member including a pair of leg portions connected by a rounded apex portion, said apex portion forming a universal pivotal connection with said rod hole; a hook portion forming the terminal end of each leg portion; a pair of diametrically opposed holes provided adjacent the inner end of said cylinder for the reception of said hook portions of the resilient wire member; a sleeve having a pair of diametrically opposite longitudinal grooves formed therein and provided at one end with a circular flange press-fitted into the inner end portion of said cylinder whereby to retain the wire member aforesaid in position; and a ring of rubber or the like interposed between the inner end marginal edge of the elongated cylinder and the flange of said retainer sleeve.

13. For incorporation in a self-contained valve assembly of the character described: a valve housing including a tubular segment; a reciprocable guide member mounted therein; a valve element supported thereon for opening and closing a fluid delivery valve; longitudinal fluid passageways formed in the peripheral surface of the main body of the guide member; a rod rigid with the guide member and projecting axially therefrom; a centrally bored plug for slidably supporting said rod; a preloaded compression spring interposed about the rod between said main body portion of the guide member and one end of said plug to normally effect the closing of said fluid delivery valve; a hole formed in the free extremity of the rod; a semicircular end formed on the plug opposite the spring engaging end thereof; an elongated cylinder having its outer end portion disposed in contact with the semicircular end aforesaid of the plug and with the inner edge of the tubular segment of said valve housing; a resilient wire member comprising a pair of leg portions connected by a rounded apex portion, said apex portion having a pivotal connection with the hole in said rod, and each of said leg portions terminating in a projecting hook portion disposed in one of a pair of diametrically opposite holes provided therefor in the elongated cylinder adjacent the inner end thereof; a sleeve press-fitted into said inner end of the cylinder to retain said hook portions in the holes aforesaid, said sleeve having an annular flange equal in diameter to that of the cylinder, and being provided with a pair of diametrically opposite external grooves adapted to accommodate the extremities of the leg portions that are adjacent said hook portions; and a ring of rubber or the like having a diameter larger than the cylinder interposed about the sleeve between the inner marginal edge of said cylinder and said flange.

References Cited in the file of this patent
UNITED STATES PATENTS

| 625,434 | Browne | May 23, 1899 |
| 2,694,211 | Warren | Nov. 16, 1954 |

FOREIGN PATENTS

| 520,068 | Great Britain | of 1940 |